(12) United States Patent
Kaplan et al.

(10) Patent No.: US 12,056,072 B1
(45) Date of Patent: Aug. 6, 2024

(54) LOW LATENCY MEMORY NOTIFICATION

(71) Applicant: Amazon Technologies, Inc., Seattle, WA (US)

(72) Inventors: Patricio Kaplan, Palo Alto, CA (US); Ron Diamant, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/457,603

(22) Filed: Dec. 3, 2021

(51) Int. Cl.
*G06F 13/28* (2006.01)
*G06F 3/06* (2006.01)

(52) U.S. Cl.
CPC ............ *G06F 13/28* (2013.01); *G06F 3/0611* (2013.01); *G06F 3/0655* (2013.01); *G06F 3/0679* (2013.01); *G06F 2213/28* (2013.01)

(58) Field of Classification Search
CPC ...... G06F 13/28; G06F 3/0611; G06F 3/0655; G06F 3/0679; G06F 2213/28
See application file for complete search history.

(56) References Cited

U.S. PATENT DOCUMENTS

| | | | | |
|---|---|---|---|---|
| 10,467,175 B1 * | 11/2019 | Haldar | ................ | G06F 13/4243 |
| 11,449,232 B1 * | 9/2022 | Kannan | ................ | G06F 3/0679 |
| 11,467,992 B1 * | 10/2022 | Kaplan | ................ | G06F 3/0655 |
| 2018/0183873 A1 * | 6/2018 | Wang | ................ | G05D 1/0088 |
| 2019/0190892 A1 * | 6/2019 | Menachem | .......... | G06F 21/602 |
| 2022/0343146 A1 * | 10/2022 | Xue | ........................ | G06N 3/044 |

FOREIGN PATENT DOCUMENTS

CN 114020666 A * 2/2022

* cited by examiner

*Primary Examiner* — Idriss N Alrobaye
*Assistant Examiner* — Richard B Franklin
(74) *Attorney, Agent, or Firm* — Weaver Austin Villeneuve & Sampson LLP

(57) ABSTRACT

Techniques to reduce the latency of data transfer notifications in a computing system are disclosed. The techniques can include receiving, at a memory, a first access request of a set of access requests associated with a data transfer. The first access request has a token and an access count indicating the number of access requests in the set of access requests. A counter is initiated to count the number of received access requests having the token. When additional access requests belonging to the set of access requests are received, the counter is incremented for each of the additional access requests being received. A notification is transmitted to an integrated circuit component in response to receiving the last access request of the set of access requests having the token to notify the integrated circuit component that the memory is ready for access.

19 Claims, 9 Drawing Sheets

LOW LATENCY MEMORY NOTIFICATION

BACKGROUND

Complex computing systems can utilize multiple processing units (e.g., processors, accelerators, etc.) to provide high throughput parallel execution. In some applications, computational data such as weight values used in machine learning are distributed amongst the processing units. The processing units may communicate with each other via one or more interconnects. To move data around efficiently (e.g., between buffer memories, system memories, etc.), the computing system may include multiple direct memory access (DMA) engines to facilitate the data transfers.

BRIEF DESCRIPTION OF THE DRAWINGS

Various embodiments in accordance with the present disclosure will be described with reference to the drawings, in which.

DETAILED DESCRIPTION

Figure 1:
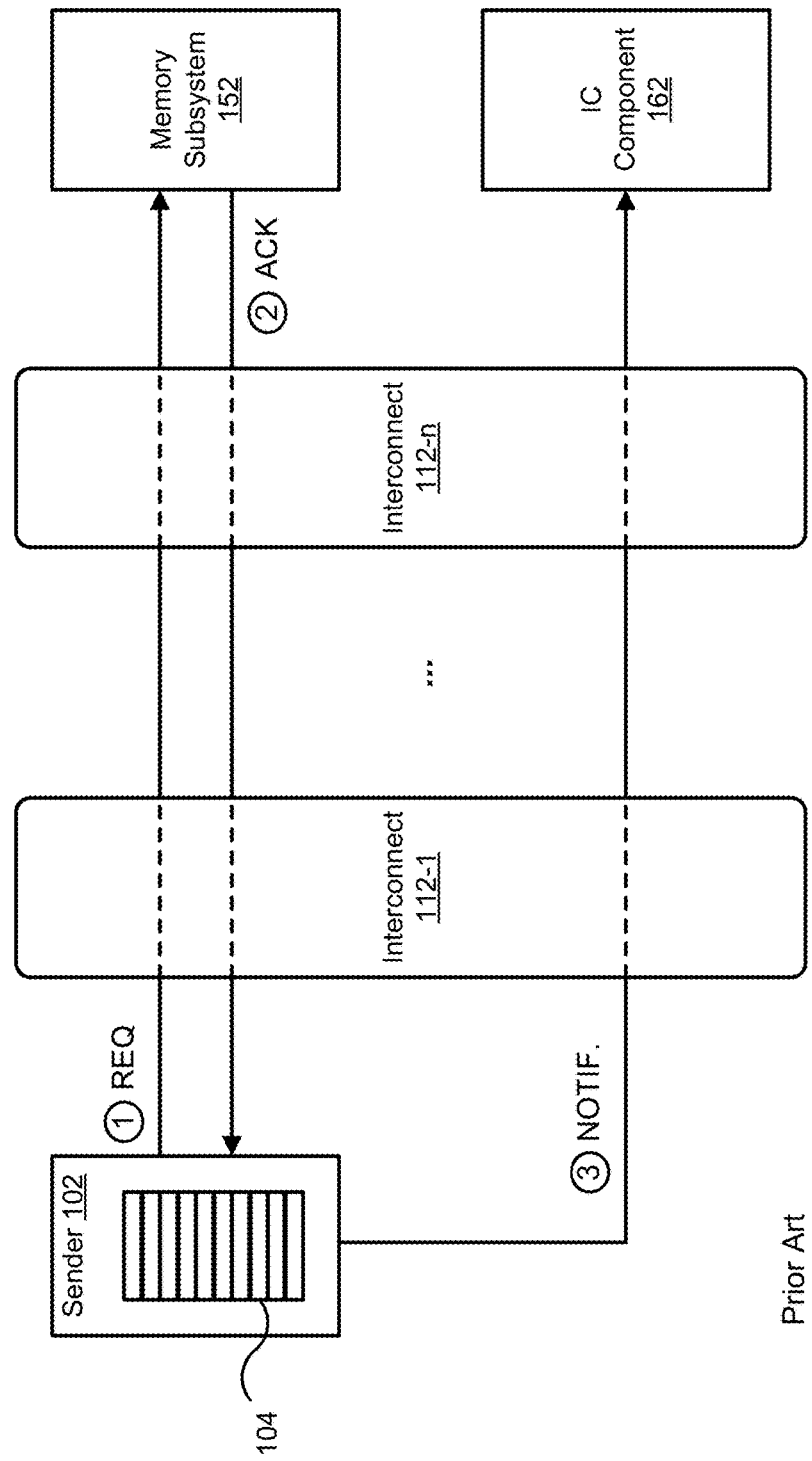
FIG. 1 illustrates a block diagram of an example of a computing system.

Data transfers in a complex computing system can involve communications between multiple components of the system. For example, a DMA engine may transfer data located in a first accelerator to a target memory of a second accelerator to be used by an execution engine of the second accelerator. Large data transfers can be written to the target memory over multiple memory accesses. When the target memory returns an acknowledgement of the last memory access of the data transfer to the DMA engine, the DMA engine can send a notification to the execution engine of the second accelerator to indicate that the data is ready in the target memory for access by the execution engine. However, such a data transfer acknowledgement and notification implementation can incur unnecessary latencies. For example, the acknowledgment from the target memory may have to traverse through multiple interconnect fabrics to reach the DMA engine, and the notification from the DMA engine may have to traverse through the multiple interconnect fabrics again to reach the execution engine. This round-trip delay can be further exacerbated due to traffic congestion at the interconnect fabrics. Even though the data is already available in the target memory, the notification that the data is ready may not reach the execution engine until hundreds of cycles later.

To reduce the latency of data transfer notifications in a computing system, the techniques disclosed herein allow a notification indicating that the memory is available for access to be sent to a memory user (e.g., execution engine) upon the memory receiving all of the access requests of a data transfer. To provide a memory subsystem with the capability to track the reception of access requests belonging to a data transfer, the access requests to the memory are tagged with a token to identify the data transfer that the access requests belong to. An access count indicating the total number of access requests used in the data transfer is also provided to the memory subsystem. A counter can be implemented in the memory subsystem to count the number of access requests having the same token that have been received by the memory. When the counter value reaches the access count, all access requests belonging to the same data transfer have been received by the memory, and a notification is transmitted to the memory user to notify the memory user that the memory is ready to be accessed. By transmitting the notification directly from the memory subsystem to the memory user, the round-trip latency for an acknowledge to reach the sender of the memory access requests and a subsequent notification from the sender to reach the memory user can be eliminated.

The memory notification techniques can be used for both writes and reads accesses. For write accesses, the access requests can be used to write data to the memory, and a notification is transmitted to the memory user when the last write request of a write data transfer is received by the memory. This allows the memory user to access the memory to obtain the newly written data as soon as the data is ready. For read accesses, the access requests can be used to read data from the memory to free up space in the memory (e.g., to move data from the memory to another location). A notification is transmitted to the memory user when the last read request of a read data transfer is received by the memory to notify the memory user that space is now available in the memory for the memory user to use.

In some implementations, a computing system may utilize multiple access request senders such as multiple DMA engines to perform a data transfer. Typically, each sender will transmit a separate notification to the memory user when their respective memory accesses are complete. The techniques disclosed herein can be used to consolidate the notifications from multiple senders into a single notification sent from the memory subsystem to the memory user when multiple senders are involved with a data transfer. The memory subsystem can also implement multiple counters to concurrently track and count access requests for different data transfers. For example, in complex computing systems, access requests for different data transfers associated with different tasks can intervene each other when they are received by the memory subsystem. In other words, an access request for one data transfer can be received in between access requests for another data transfer. This may occur, for example, when the interconnect fabrics arbitrate access requests from different sources due to congestion or other factors. By implementing multiple counters, each data transfer in progress can be tracked individually to expedite their respective notifications to the memory user.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 illustrates a block diagram of an example of a computing system 100. Computing system 100 includes an access request sender 102, a memory subsystem 152, and an integrated circuit component 162. Computing system 100 may include additional components not specifically shown. Access request sender 102 can be a processing component (e.g., a processor, a coprocessor, an accelerator, a field programmable gate array (FPGA), etc.), a peripheral component (e.g., an input/output component, a communication interface component, a network interface component, etc.), a support component (e.g., direct memory access (DMA) engine, memory management component, etc.), or other suitable component that can issue access requests to memory subsystem 152 to read or write data.

Memory subsystem 152 may include one or more memory components such as a buffer memory, cache memory, system memory, etc., and memory interface logic. The memory of memory subsystem 152 can be implemented using static random access memory (SRAM), dynamic random access memory (DRAM), flash memory, or other suitable memory or storage technologies. The memory implemented in memory subsystem 152 may include one or more memory partitions such as one or more memory banks. Memory subsystem 152 can be accessed by various components of computing system 100, and can be shared by one or more components of computing system 100.

Integrated circuit (IC) component 162 is a memory user that uses memory subsystem 152. IC component can be a processing component (e.g., a processor, a coprocessor, an accelerator, a field programmable gate array, etc.), a peripheral component (e.g., an input/output component, a communication interface component, a network interface component, etc.), a support component (e.g., direct memory access (DMA) engine, memory management component, etc.), or other suitable component that reads data from memory 152 or writes data to memory subsystem 152. In some implementations, the same component in computing system 100 can act as an access request sender 102 on some data transfers, and act as IC component 162 on other data transfers.

The components of computing system 100 can be communicatively coupled with each other via one or more interconnect components 112-1 to 112-n. Computing system 100 can be implemented, for example, as a system-on-chip (SoC), a multi-chip system, a cloud computing system with processing nodes coupled via a network, or other suitable architectures or topologies. Interconnect components 112-1 to 112-n may include one or more interconnections within a SoC, one or more interconnections between chips and/or system components, and/or one or more networked connections such as Ethernet. One or more of interconnect components 112-1 to 112-n may implement a communication protocol such as Advanced eXtensible Interface (AXI) protocol, Open Core Protocol (OCP), Peripheral Component Interconnect (PCI) family of protocols, Ethernet, or other suitable communication protocols for exchanging data. Interconnect components 112-1 to 112-n can be implemented using signal busses, crossbars, meshes, matrices, fabrics, and/or combinations thereof.

Communications between certain components of computing system 100 may traverse through more interconnect components than others, and communication between some components may not require traversing through any interconnect component. By way of example, communications between access request sender 102 and memory subsystem 152 may transverse through two or more interconnect components 112-1 to 112-n. Similarly, communications between access request sender 102 and IC component 162 may transverse through two or more interconnect components 112-1 to 112-n. However, communications between memory subsystem 152 and IC component 162 may not require traversing through any interconnect component. Such a scenario may occur, for example, if memory subsystem 152 and IC component 162 are part of the same chip and are connected using local routing, whereas access request sender 102 can be located on a different chip than memory subsystem 152 and IC component 162. In some implementations, memory subsystem 152 and IC component 162 may communicate via an interconnect component not specifically shown, or via one of the interconnect components shown such as interconnect component 112-n.

During operation, access request sender 102 may have data to write to memory subsystem 152. For example, access request sender 102 can be a DMA engine that is facilitating transfer of weight values or weight gradients during a distributed training operation from a first neural network accelerator to memory subsystem 152 used by a second neural network accelerator that IC component 162 is part of. The data transfer may involve transferring a large amount of data, and the data can be split up into multiple memory accesses. In some implementations, access request sender 102 may implement a memory descriptor queue 104 to perform the memory accesses. Each memory descriptor may include a destination address pointing to a location in the memory of memory subsystem 152, and access request sender 102 may perform the data transfer by issuing write requests to write data to the destination addresses indicated in the memory descriptors.

Referring to FIG. 1, access request sender 102 may send a series of write requests to write data to the memory of memory subsystem 152. The write requests may traverse through interconnect components 112-1 to 112-n before reaching memory subsystem 152. Upon receiving each write request, memory subsystem 152 may send an acknowledgment back to access request sender 102. The acknowledgments may traverse through interconnect components 112-1 to 112-n to reach access request sender 102. The acknowledgments can be used by access request sender 102 to determine if memory subsystem 152 has received each of the write requests. For example, in some implementations, if an acknowledgement is not received within a certain elapsed time from the write request, access request sender 102 may resend the write request. When access request sender 102 receives the acknowledgment corresponding to the last write request of the data transfer, access request sender 102 can determine that the data transfer is complete. Access request sender 102 may then send a notification to IC component 162 to notify IC component 162 that data has been written to memory subsystem 152 and is ready to be accessed by IC component 162.

As illustrated by FIG. 1, even though the data being written is already available in memory subsystem 152 at the time the last acknowledgement is sent by memory subsystem 152, IC component 162 is not aware of the data's availability until after a notification is received from the access request sender 102, which is sent in response to the access request sender 102 receiving the acknowledgement from memory subsystem 152. In small computing systems in which these messages may traverse over a short distance, the round-trip delay may take tens of cycles to propagate from the memory subsystem 152 to the access requests sender 102, and then from the access request sender 102 to IC component 162. However, in complex computing systems in which these messages traverse through multiple interconnect components 112-1 to 112-n (e.g., interconnect fabrics), the round-trip delay can be hundreds of clock cycles. The increase in latency can be attributed to the propagation delay, as well as possible congestion at the interconnects because the interconnects are also handling traffic for other system components. In instances in which IC component 162 is an execution engine, the execution task that utilizes the newly written data may wait until the notification of the data's availability is received before starting execution. Hence, the round-trip delay of the acknowledgement and notification messages can cause execution delays and reduce system performance.

Figure 2:
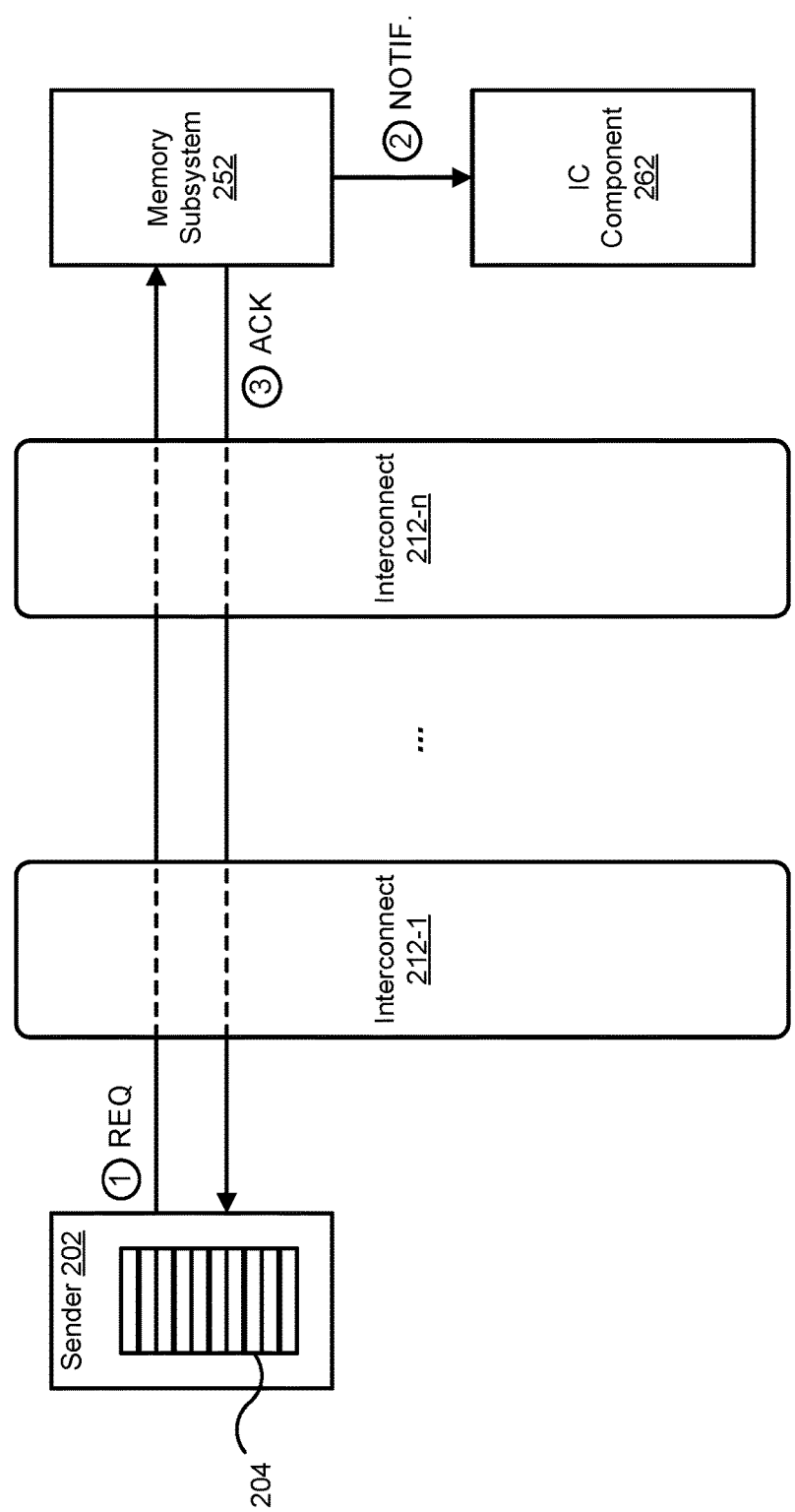
FIG. 2 illustrates a block diagram of another example of a computing system.

FIG. 2 illustrates a block diagram of another example of a computing system 200. Computing system 200 includes an access request sender 202, interconnect components 212-1 to 212-n, a memory subsystem 152, and an IC component 262. The various components are similar to computing system 100, and thus a detailed description of which need not be repeated.

During operation, access request sender 202 may have data to write to memory subsystem 252. For example, access request sender 202 can be a DMA engine that is facilitating transfer of weight values or weight gradients during a distributed training operation from a first neural network accelerator to memory subsystem 252 used by a second neural network accelerator that IC component 262 is part of. The data transfer may involve transferring a large amount of data, and the data can be split up into multiple memory accesses. In some implementations, access request sender 202 may implement a memory descriptor queue 204 to perform the memory accesses. Each memory descriptor may include a destination address pointing to a location in the memory of memory subsystem 252, and access request sender 202 may perform the data transfer by issuing write requests to write data to the destination addresses indicated in the memory descriptors.

Access request sender 202 may send a series of write requests to write data to the memory of memory subsystem 252. The write requests may traverse through interconnect components 212-1 to 212-n before reaching memory subsystem 252. Upon receiving each write request, memory subsystem 152 may send an acknowledgment back to access request sender 202. The acknowledgments may traverse through interconnect components 212-1 to 212-n to reach access request sender 202. In contrast to computing system 100, when memory subsystem 252 receives the last write request of the data transfer, memory subsystem 252 transmits a notification to IC component 262 to notify IC component 262 that the data is ready for access in memory subsystem 252 as shown in FIG. 2. Although memory subsystem 252 still sends an acknowledgement to access request sender 202 so that access request sender 202 can track completion of the data transfer, the notification is transmitted to IC component 262 without having to wait for the acknowledgement to reach access request sender 202. In some implementations, the acknowledgement can be sent by memory subsystem 252 after sending the notification to IC component 162.

By sending the notification directly from memory subsystem 252 to IC component 262, the round-trip delay latency of the acknowledgment and notification messages exhibited in computing system 100 can be eliminated. In most instances, IC component 262 may also be physically closer to memory subsystem 252 than access request sender 202, and hence the notification will reach IC component 262 with less propagation delay than if sent by access request sender 202. For example, memory subsystem 252 can be on the same chip as IC component 262. As a result, IC component 162 is notified of the availability of the newly written data sooner, and the execution task utilizing the newly written data can be started sooner to improve system performance. In this manner, initiation of the execution task can be synchronized with the availability of the data in memory subsystem 252.

The notification techniques described with reference to FIG. 2 can also be used for read requests. For example, during operation, data stored in memory subsystem 252 can be moved to another location (e.g., to a slower memory) to free up space in memory subsystem 252 for IC component 262. In instances in which access request sender 202 is a DMA engine, each memory descriptor for the read request may include a source address pointing to a location of the data to be read in the memory of memory subsystem 252, and access request sender 202 may issue a series of read requests with the source addresses indicated in the memory descriptors. Memory subsystem 252 may respond to each read request by providing an acknowledgement including the data being read to access request sender 202. Similar to the write requests described above, memory subsystem 252 can send a notification to IC component 262 upon receiving the last read request of the data transfer. The notification informs IC component 262 that the read data transfer is complete and that the space occupied by the read data has freed up and can be overwritten by IC component 262. Hence, as compared to waiting for the notification from access request sender 202, IC component 262 can be given access to the memory space as soon as the previous data has been read. It should be noted that for read access requests, if the read data of a request contains an uncorrectable error, memory subsystem 252 may send an error message or an interrupt to the access request sender 202 to indicate that a memory error has occurred and terminate the data transfer.

Figure 3:
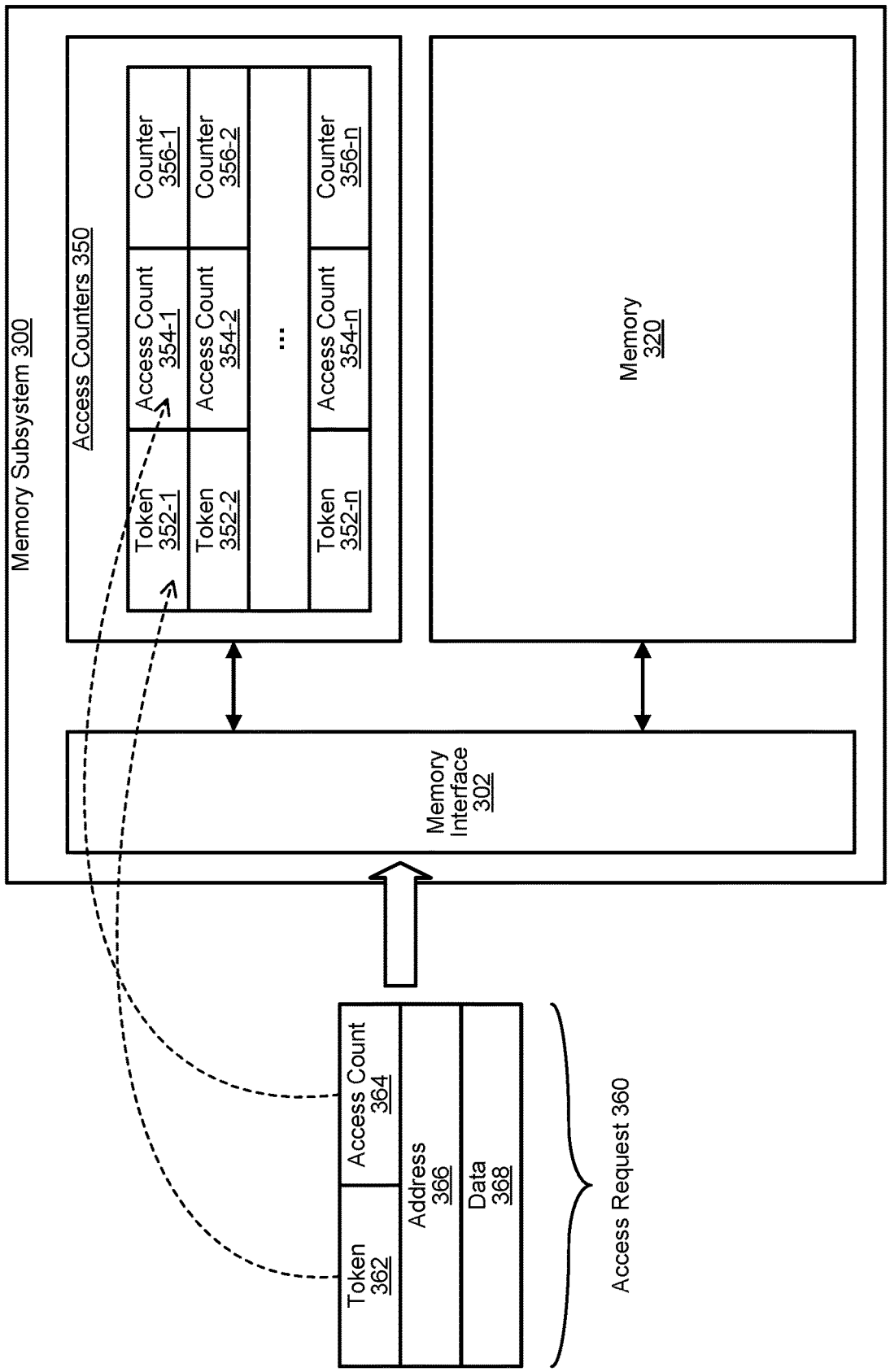
FIG. 3 illustrates a block diagram of an example of a memory subsystem.

FIG. 3 illustrates a block diagram of an example of a memory subsystem 300. Memory subsystem 300 can be used, for example, to implement memory subsystem 252. Memory subsystem 300 includes a memory interface 302, a memory 320, and a set of access counters 350. Memory interface 302 includes logic circuitry that is operable to receive and process access requests to read or write to memory 320, and to generate acknowledgments for the access requests. Memory interface 302 is also operable to initiate, update, and reset access counters 350, and generate notifications to send to IC components waiting for the completion of data transfers.

Access counters 350 may include one or more counters to count the number of access requests received for a data transfer. At any point in time, multiple data transfers can be taking place concurrently, and memory subsystem 300 may receive intervening access requests for different data transfers. This may occur, for example, when multiple senders are sending access requests to memory subsystem 300, and/or when certain access requests are delayed due to traffic congestion to cause the access requests belonging to the same data transfer to be spread apart. In some implementations, the different data transfers taking place concurrently may include a mix of read and write data transfers. The data transfers can be associated with different execution tasks for the same IC component or for different IC components. The access requests for the same data transfer and/or for different data transfers can be received from multiple access request senders. By implementing multiple counters, the access requests for different data transfers can be tracked concurrently.

Each data transfer can be associated with a token. The token can be used, for example, to identify an execution task and/or the IC component waiting for completion of the data transfer. In some implementations, the token can be assigned by software executing on the system. Each of the access requests associated with a data transfer is transmitted with the token to the memory subsystem 300. In this manner, access counters 350 are able to track the number of access requests received for each distinct data transfer. In implementations in which the access request sender is a DMA engine, the token can be embedded in the memory descriptors associated with the data transfer. For example, the token can be embedded in the address field of the memory descriptor (e.g., source address of a read request, destination address of a write request), and is provided with each access request to memory subsystem 300.

The first access request of a data transfer is also sent to memory subsystem 300 with an access count indicating the total number of access requests that are included in the data transfer. The access count is used by memory subsystem 300 to determine when the last access request of a data transfer has been received. In some implementations, each access request associated with a data transfer is sent with the access count. In such implementations, every access request belonging to a data transfer is sent with the same token and the same access count. In other implementations, the access count can be omitted from subsequent access requests that are part of the same data transfer.

Referring to FIG. 3, an access request sender may send an access request 360 to memory subsystem 300. The access request 360 may include a token 326, an access count 364 indicating the number of access requests in the data transfer, and an address 366. In some implementations, token 326 and/or access count 364 can be embedded as part of the address of access request 360. If access request 360 is a write request, then address 366 will be a destination address indicating a location in memory 320 to store data, and access request 360 may further include data 368 to be written into memory 320. If access request 360 is a read request, then address 366 will be a source address indicating a location in memory 320 to read data from.

When memory interface 302 receives access request 360, if a counter in access counters 350 has not yet been allocated for the data transfer (e.g., access request 360 is the first access request of a data transfer), memory interface 302 can initiate a counter in access counters 350 by associating a counter with the token 362 received in the access request 360. The counter is also associated with the access count 364. For example, token 364 and access count 364 can be stored in a token entry 352-1 and access count entry 354-1, respectively, which are mapped to a counter 356-1. In some implementations, memory interface 302 also sends an acknowledgement back to the access request sender to acknowledge reception of the access request.

When a subsequent access request is received having the same token 362, counter 356-1 is incremented. When counter 356-1 reaches the value stored in access count entry 354-1, memory interface 302 can determine that the last access request for the data transfer has been received, and a notification can be sent to the IC component waiting for the data transfer to complete. In implementations in which each access request includes the access count, it is not necessary to store the access count in an access count entry 354-1, and the value of counter 356-1 can be compared with the access count received in the access request to determine if the last access request of a data transfer has been received. Upon sending a notification to the IC component indicating completion of the data transfer, the counter 356-1 is reset such that counter 356-1 can be used for the next data transfer. It should be noted that the corresponding counter for a data transfer is also reset when an uncorrectable error is encountered for a read request and the data transfer is terminated.

As shown in FIG. 3, access counters 350 can also include multiple counters that are active concurrently to track data transfers with other distinct tokens. For example, access counters 350 may include a second counter 356-2 that is mapped to a token 352-2 and access count 354-2, and a $n^{th}$ counter 356-$n$ that is mapped to a token 352-$n$ and access count 354-$n$. In some implementations, access counters 350 can be implemented as a separate storage as shown. Access counters 350 can also be implemented using a region of memory 320. In implementations in which access counters 350 are implemented using memory 320, the number of counters can be dynamically adjusted based on the number of active data transfers.

Figure 4:
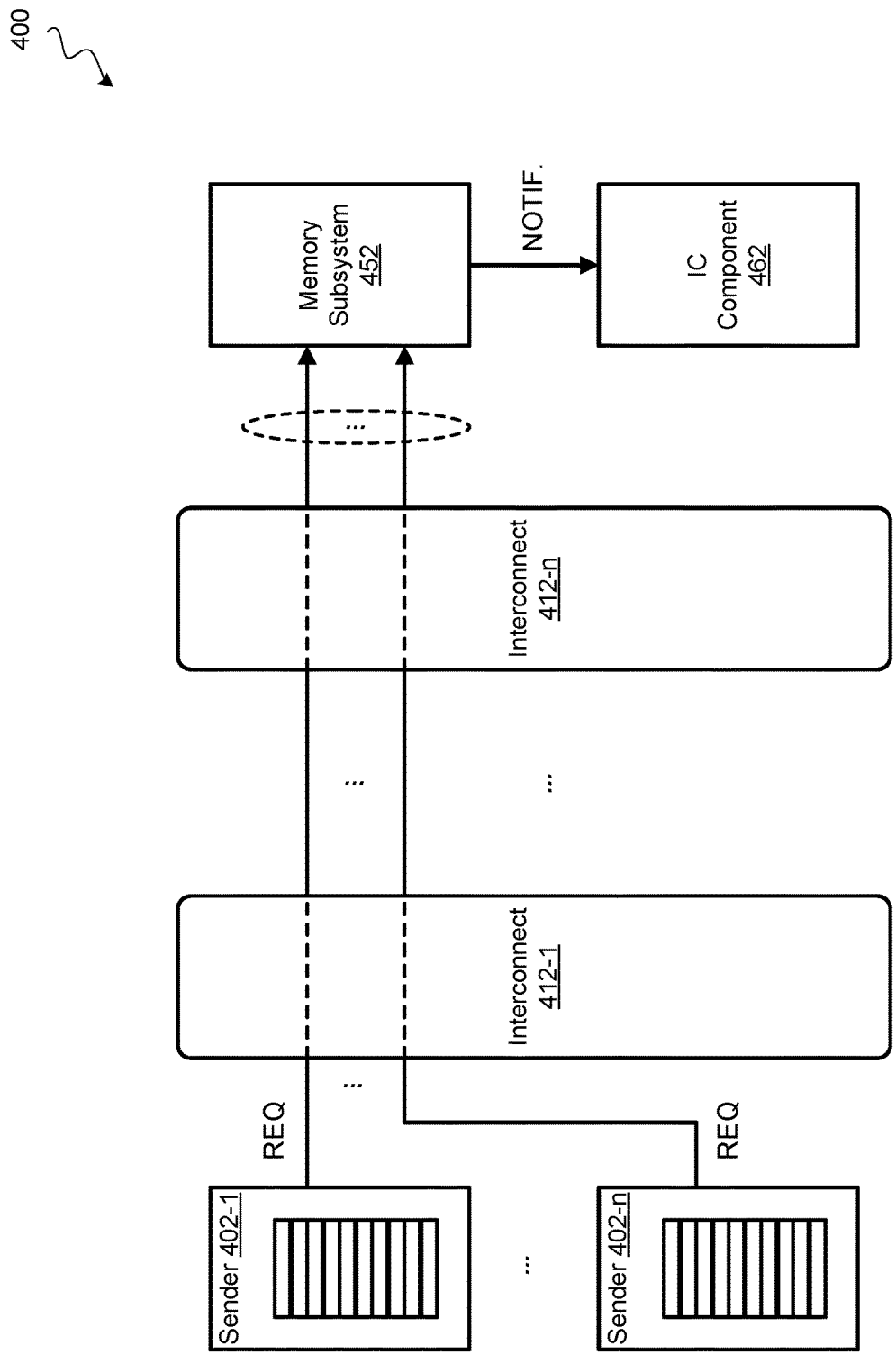
FIG. 4 illustrates a block diagram of a further example of a computing system.

FIG. 4 illustrates a block diagram of a further example of a computing system 400. Computing system 400 includes one or more access request senders 402-1 to 402-$n$, interconnect components 412-1 to 412-$n$, a memory subsystem 452, and an IC component 462. The various components are similar to computing system 200, and thus a detailed description of which need not be repeated.

During operation, multiple access request senders 402-1 to 402-$n$ can be used to issue access requests that are part of the same data transfer to memory subsystem 452. For example, access request senders 402-1 to 402-$n$ can be a set of DMA engines facilitating the data transfer. Each of the access requests sent by access request senders 402-1 to 402-$n$ belonging to the data transfer may include the same token. The access requests may also include the same access count indicating a total number of access requests being used across the multiple senders for the data transfer. A single counter in memory subsystem 452 can be allocated to count the number of access requests received having the same token.

The notification techniques described above can be used to consolidate the notification from the different access request senders. Instead of waiting for each individual access request sender to transmit a notification to IC component 462, memory subsystem 452 can send a notification to IC component 462 when the number of access requests received from across the different access request senders 402-1 to 402-$n$ reaches the access count. Similar to the techniques described above, sending a notification from memory subsystem 452 directly to IC component 462 may allow IC component 462 to access the memory subsystem 452 sooner. Furthermore, by consolidating the notification messages into a single notification, the amount of communication traffic traversing through the interconnects of the system can also be reduced. It should also be noted that the access requests shown in FIG. 4 can be used for both write accesses as well as read accesses.

Figure 5:
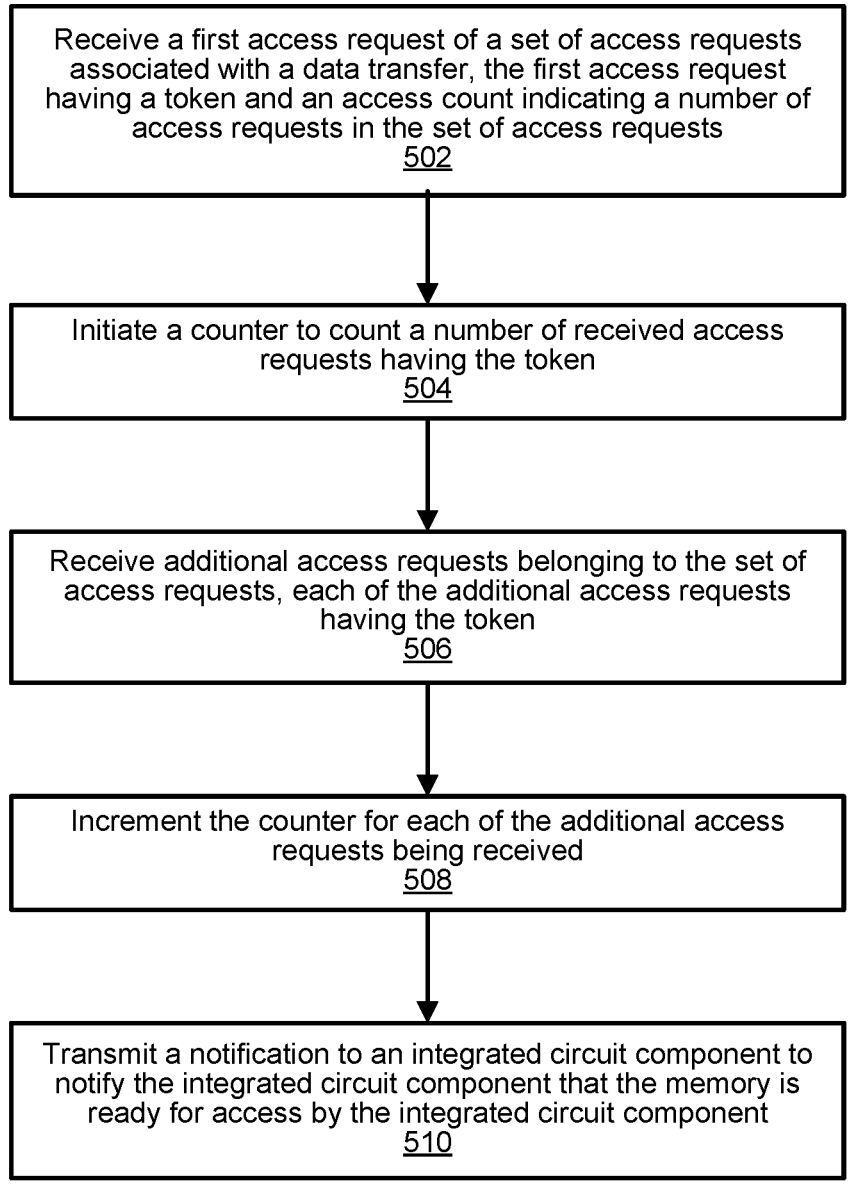
FIG. 5 illustrates a flow diagram of an example of a data transfer process.

FIG. 5 illustrates a flow diagram of an example of a process 500 for data transfer in a computing system. Process 500 can be performed, for example, by a memory subsystem of the computing system such as memory subsystem 252, 300, or 452. The computing system may include one or more memory access request senders operable to issue access requests to the memory subsystem such as one or more direct memory access (DMA) engines or other suitable components, and one or more IC components that use the memory subsystem such as one or more execution engines, processing units, accelerators, etc. The memory subsystem may include a memory interface, a memory to store data, and a set of counters that are each operable to count a number of access requests received by the memory subsystem based on the token of each access request, with each counter being allocated to a distinct token. In some implementations, each token can be associated with a corresponding execution task of an execution engine.

Process 500 may begin at block 502 by receiving, at the memory subsystem, a first access request of a set of access requests associated with a data transfer. The first access request can include a token and an access count indicating a total number of access requests in the set of access requests. In implementations in which the sender of the access request is a DMA engine, the token can be embedded in a memory descriptor (e.g., in the address field) used by the DMA engine to perform the data transfer. In some implementations, the memory interface of the memory subsystem may send an acknowledgement to a sender of the first access request in response to receiving the first access request. The set of access requests for the data transfer can be associated with an execution task of an execution engine.

At block 504, a counter in the memory subsystem is initiated to count a number of received access requests having the token. The counter can be initialized to a value of one (given the reception of the first access request), and be mapped to or associated with the token and the access count. The counter can be one of multiple counters implemented in the memory subsystem, and each counter can be initiated to count access requests corresponding to a different token.

At block 506, the memory subsystem may receive additional access requests belonging to the set of access requests. Each of the additional access requests belonging to the set of access requests of the data transfer includes the same token. The same access count indicating the total number of access requests in the data transfer can also be included with each of the additional access requests. In some implementations, an acknowledgment can be sent to the sender of each of access request. The set of access requests can be received from the same sender, or from multiple senders such as multiple DMA engines.

At block 508, the counter is incremented for each of the additional access requests in the set of access requests being received having the associated token. It should be noted that the access requests belonging to the same set of access requests can be received with intervening access requests that contain different tokens (e.g., for different data transfers such as data for different execution tasks). In such scenarios, the counters associated with the different tokens are incremented as those access requests are received.

At block 510, in response to receiving the last access request in the set of access requests causing the counter associated with the token to reach the access count, the memory interface may transmit a notification to an integrated circuit component (e.g., an execution engine) to notify the integrated circuit component that the memory is ready for access by the integrated circuit component. The notification can indicate to the execution engine that the execution task that uses the memory can be started. The counter is then resetted in response to receiving this last access request. In some implementations, an acknowledgement can be transmitted to a sender of the last access request after the notification has been sent to the integrated circuit component.

Process 500 can be used for write access requests and/or read access requests. For example, the set of access requests being received by the memory subsystem can be write requests to write data to the memory to be utilized by an integrated circuit component such as an execution engine. In the context of a neural network, the data being written can include weight data (e.g., weight values or weight gradients) of a neural network model, and the integrated circuit component can be part of a neural network accelerator. The weight data can be transferred to the memory as part of a distributed learning operation or part of a distributed inference operation (e.g., model parallel or data parallel execution).

As another example, the set of access requests being received by the memory subsystem can be read requests to read data from the memory. The read can be performed to free up space in the memory, for example, to copy the data from the memory subsystem to a different memory. In such scenarios, the notification is transmitted to the integrated circuit component (e.g., an execution engine) waiting on the memory to indicate that space is available in the memory for the integrated circuit component to use. In some implementations, a set of write access requests for a write data transfer and a set of read access requests for a read data transfer may occur concurrently, and the access requests for both data transfers can be received in an intervening manner with each other.

Figure 6:
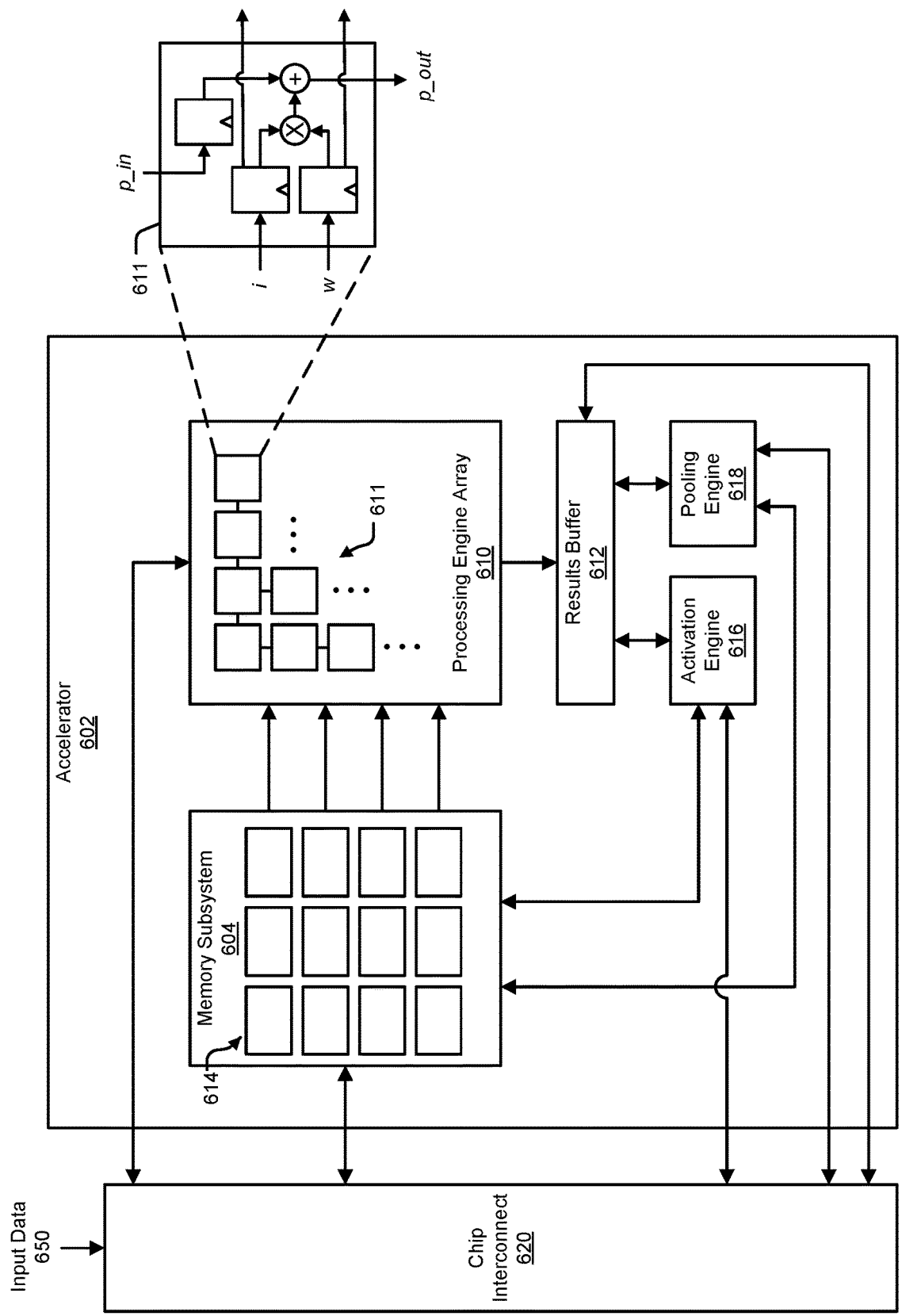
FIG. 6 illustrates a block diagram of an example of an integrated circuit device.

FIG. 6 is a block diagram illustrating an example of an integrated circuit device that can include components of the computing systems described herein. The example of FIG. 6 illustrates an accelerator 602. In various examples, the accelerator 602, for a set of input data (e.g., input data 650), can execute computations using a processing engine array 610, an activation engine 616, and/or a pooling engine 618. In some examples, the example accelerator 602 may be an integrated circuit component of a processor, such as a neural network processor. The processor may have other integrated circuit components, including additional accelerator engines.

In various implementations, the memory subsystem 604 can include multiple memory banks 614. In these implementations, each memory bank 614 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 614. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 604 can permit simultaneous access to the read or write channels of multiple memory banks. As another example, the memory subsystem 604 can include arbitration logic such that arbitration between, for example, the outputs of multiple memory banks 614 can result in more than one memory bank's output being used. In these and other examples, though globally managed by the memory subsystem 604, each memory bank can be operated independently of any other.

Having the memory banks 614 be independently accessible can increase the efficiency of the accelerator 602. For example, values can be simultaneously read and provided to each row of the processing engine array 610, so that the entire processing engine array 610 can be in use in one clock cycle. As another example, the memory banks 614 can be read at the same time that results computed by the processing engine array 610 are written to the memory subsystem 604. In contrast, a single memory may be able to service only one read or write at a time. With a single memory, multiple clock cycles can be required, for example, to read input data for each row of the processing engine array 610 before the processing engine array 610 can be started.

In various implementations, the memory subsystem 604 can be configured to simultaneously service multiple clients, including the processing engine array 610, the activation engine 616, the pooling engine 618, and any external clients that access the memory subsystem 604 over a communication fabric 620. In some implementations, being able to service multiple clients can mean that the memory subsystem 604 has at least as many memory banks as there are clients. In some cases, each row of the processing engine array 610 can count as a separate client. In some cases, each column of the processing engine array 610 can output a result, such that each column can count as a separate write client. In some cases, output from the processing engine array 610 can be written into the memory banks 614 that can then subsequently provide input data for the processing engine array 610. As another example, the activation engine 616 and the pooling engine 618 can include multiple execution channels, each of which can be separate memory clients. The memory banks 614 can be implemented, for example, using static random access memory (SRAM).

In various implementations, the memory subsystem 604 can include control logic. The control logic can, for example, keep track of the address spaces of each of the memory banks 614, identify memory banks 614 to read from or write to, and/or move data between the memory banks 614. In some implementations, memory banks 614 can be hardwired to particular clients. For example, a set of memory banks 614 can be hardwired to provide values to the rows of the processing engine array 610, with one memory bank servicing each row. As another example, a set of memory banks can be hard wired to receive values from columns of the processing engine array 610, with one memory bank receiving data for each column.

The processing engine array 610 is the computation matrix of the example accelerator 602. The processing engine array 610 can, for example, execute parallel integration, convolution, correlation, and/or matrix multiplication, among other things. The processing engine array 610 includes multiple processing engines 611, arranged in rows and columns, such that results output by one processing engine 611 can be input directly into another processing engine 611. Processing engines 611 that are not on the outside edges of the processing engine array 610 thus can receive data to operate on from other processing engines 611, rather than from the memory subsystem 604.

In various examples, the processing engine array 610 uses systolic execution, in which data arrives at each processing engine 611 from different directions at regular intervals. In some examples, input data can flow into the processing engine array 610 from the left and weight values can be loaded at the top. In some examples weights and input data can flow from the left and partial sums can flow from top to bottom. In these and other examples, a multiply-and-accumulate operation moves through the processing engine array 610 as a diagonal wave front, with data moving to the right and down across the array. Control signals can be input at the left at the same time as weights, and can flow across and down along with the computation.

In various implementations, the number of columns in the processing engine array 610 determines the computational capacity of the processing engine array 610, and the number of rows determines the required memory bandwidth for achieving maximum utilization of the processing engine array 610. The processing engine array 610 can have, for example, 64 columns and 128 rows, or some other number of columns and rows.

An example of a processing engine 611 is illustrated in FIG. 6 in an inset diagram. As illustrated by this example, a processing engine 611 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 611.

In the illustrated example, an input from above can include a partial sum, p_in, provided either from another processing engine 611 or from a previous round of computation by the processing engine array 610. When starting a computation for a new set of input data, the top row of the processing engine array 610 can receive a fixed value for p_in, such as zero. As illustrated by this example, i and w are multiplied together and the result is summed with p_in to produce a new partial sum, p_out, which can be input into another processing engine 611. Various other implementations of the processing engine 611 are possible.

Outputs from the last row in the processing engine array 610 can be temporarily stored in the results buffer 612. The results can be intermediate results, which can be written to the memory banks 614 to be provided to the processing engine array 610 for additional computation. Alternatively, the results can be final results, which, once written to the memory banks 614 can be read from the memory subsystem 604 over the communication fabric 620, to be output by the system.

In some implementations, the accelerator 602 includes an activation engine 616. In these implementations, the activation engine 616 can combine the results from the processing engine array 610 into one or more output activations. For example, for a convolutional neural network, convolutions from multiple channels can be summed to produce an output activation for a single channel. In other examples, accumulating results from one or more columns in the processing engine array 610 may be needed to produce an output activation for a single node in the neural network. In some examples, activation engine 616 can be bypassed.

In various examples, the activation engine 616 can include multiple separate execution channels. In these examples, the execution channels can correspond to the columns of the processing engine array 610, and can perform an operation on the outputs of a column, the result of which can be stored in the memory subsystem 604. In these examples, the activation engine 616 may be able to perform between 1 and n parallel computations, where n is equal to the number of columns in the processing engine array 610. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 602 can include a pooling engine 618. Pooling is the combining of outputs of the columns of the processing engine array 610. Combining can include for example, computing a maximum value, a minimum value, an average value, a median value, a summation, a multiplication, or another logical or mathematical combination. In various examples, the pooling engine 618 can include multiple execution channels that can operating on values from corresponding columns of the processing engine array 610. In these examples, the pooling engine 618 may be able to perform between 1 and n parallel computations, where n is equal to the number of columns in the processing engine array 610. In various examples, execution channels of the pooling engine 618 can operate in parallel and/or simultaneously. In some examples, the pooling engine 618 can be bypassed.

Herein, the activation engine 616 and the pooling engine 618 may be referred to collectively as execution engines. The processing engine array 610 is another example of an execution engine. Another example of an execution engine is a Direct Memory Access (DMA) engine, which may be located outside the accelerator 602.

Input data 650 can arrive over the communication fabric 620. The communication fabric 620 can connect the accelerator 602 to other components of a processor, such as a DMA engine that can obtain input data 650 from an Input/Output (I/O) device, a storage drive, or a network interface. The input data 650 can be, for example one-dimensional data, such as a character string or numerical sequence, or two-dimensional data, such as an array of pixel values for an image or frequency and amplitude values over time for an audio signal. In some examples, the input data 650 can be three-dimensional, as may be the case with, for example, the situational information used by a self-driving car or virtual reality data. In some implementations, the memory subsystem 604 can include a separate buffer for the input data 650. In some implementations, the input data 650 can be stored in the memory banks 614 when the accelerator 602 receives the input data 650.

In some examples, the accelerator 602 can implement a neural network processing engine. In these examples, the accelerator 602, for a set of input data 650, can execute a neural network to perform a task for which the neural network was trained. Executing a neural network on a set of input data can be referred to as inference or performing inference.

The weights for the neural network can be stored in the memory subsystem 604, along with input data 650 on which the neural network will operate. The neural network can also include instructions, which can program the processing engine array 610 to perform various computations on the weights and the input data. The instructions can also be stored in the memory subsystem 604, in the memory banks 614 or in a separate instruction buffer. The processing engine array 610 can output intermediate results, which represent the outputs of individual layers of the neural network. In some cases, the activation engine 616 and/or pooling engine 618 may be enabled for computations called for by certain layers of the neural network. The accelerator 602 can store the intermediate results in the memory subsystem 604 for inputting into the processing engine array 610 to compute results for the next layer of the neural network. The processing engine array 610 can further output final results from a last layer of the neural network. The final results can be stored in the memory subsystem 604 and then be copied out to host processor memory or to another location.

Figure 7:
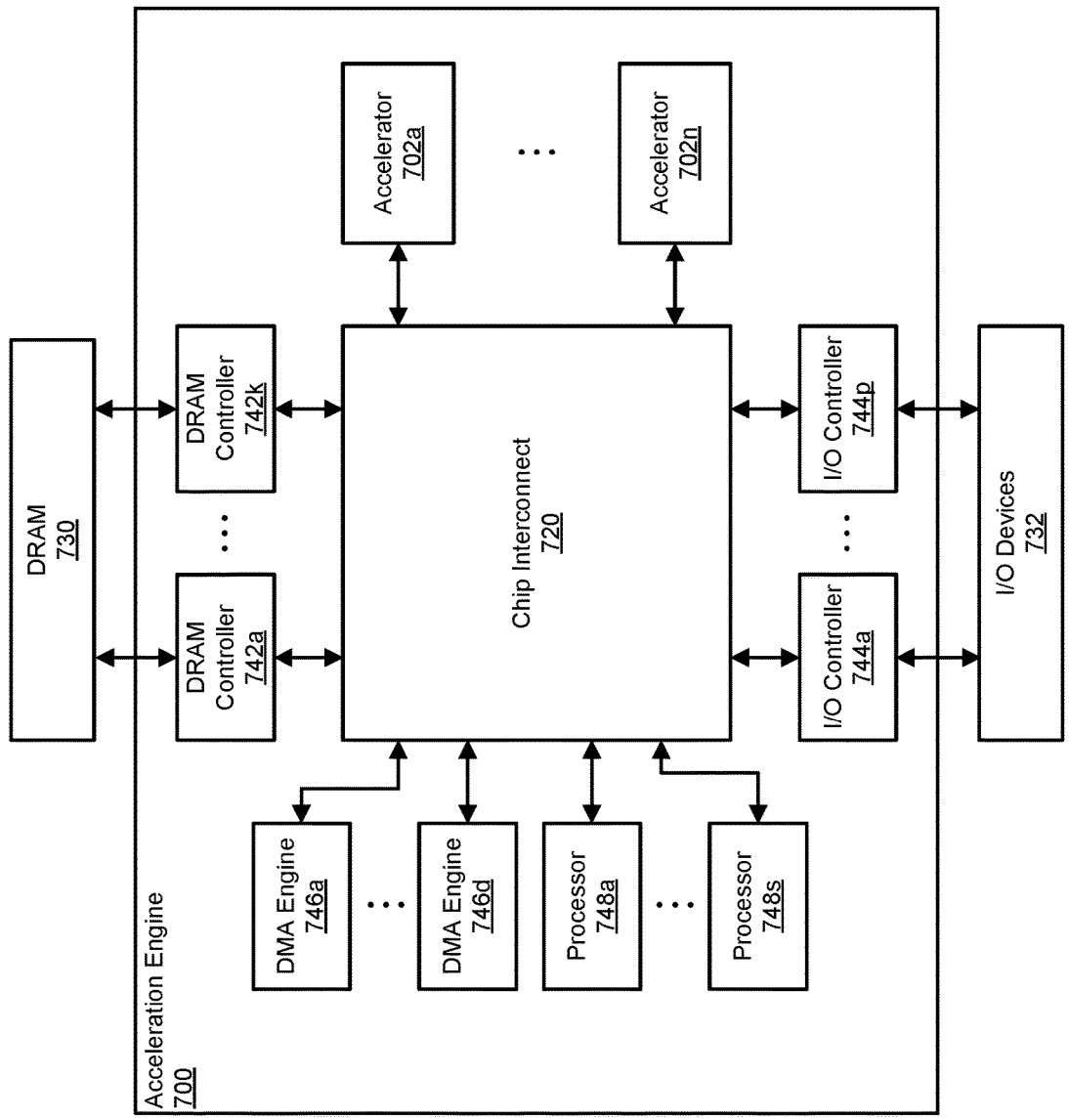
FIG. 7 illustrates a block diagram of an example of an acceleration engine.

FIG. 7 includes a block diagram that illustrates an example of an acceleration engine 700. The acceleration engine 700 is an example of an integrated circuit that can include one or more accelerators 702a-702n that may be similar to the accelerator illustrated in FIG. 6.

In the example of FIG. 7, the acceleration engine 700 includes multiple accelerators 702a-702n, each of which can perform a set of operations. In various examples, the accelerators 702a-702n are for particular types of operations, so that the accelerators 702a-702n can perform the operations much faster than when similar operations are performed by a general purpose processor. In various examples, to perform a set of operations, input data on which the operations are to be performed must first be moved into the accelerators 702a-702n. Additionally, in some cases, program code is also moved into the accelerators 702a-702n, which programs the operations that the accelerators 702a-702n will perform on the data. In the illustrated example, the acceleration engine 700 includes n accelerators 702a-702n. Examples of accelerators that can be included in the acceleration engine 700 include graphics accelerators, floating point accelerators, neural network accelerators, and others. In various examples, the accelerators 702a-702n can each be the same (e.g., each of the accelerators 702a-702n is a graphics accelerator) or can be different (e.g., the accelerators 702a-702n include a graphics accelerator, a floating point accelerator, and neural network accelerator).

The example acceleration engine 700 further includes DRAM controllers 742a-742k for communicating with an external memory. The external memory is implemented, in this example, using DRAM 730. In the illustrated example, the acceleration engine 700 includes k DRAM controllers 742a-742k, each of which may be able to communicate with an independent set of banks of DRAM. In other examples, other types of RAM technology can be used for the external memory. The DRAM controllers 742a-742k can also be referred to as memory controllers.

In various examples, input data and/or program code for the accelerators 702a-702n can be stored in the DRAM 730. Different programs can cause the accelerators 702a-702n to perform different operations. For example, when one of the accelerators is a neural network accelerator, one program can configure the neural network accelerator to perform speech recognition while another program can configure the neural network accelerator to perform image recognition. In various examples, different accelerators 702a-702n can be programmed with different programs, so that each performs a different set of operations. In various examples, the processors 748a-748s can manage moving of program code from the DRAM 730 to the accelerators 702a-702n.

The example acceleration engine 700 further includes I/O controllers 744a-744p for communicating with I/O devices 732 in the system. The acceleration engine 700 can communicate with I/O devices over, for example, a processor bus. In some examples, the processor bus can be implemented using Peripheral Component Interconnect (PCI) and/or a variation of the PCI bus protocol. The processor bus can connect the acceleration engine 700 to I/O devices such as, for example, input and output devices, memory controllers, storage devices, and/or network interface cards, among other things. In some examples, the I/O controllers 744-744p can enable the acceleration engine 700 to act as an I/O device for a host processor. For example, the acceleration engine 700 can be the recipient of input data from the host processor, and a command indicating an operation to be performed on the input data (e.g., a particular computation or analysis). In the illustrated example, the acceleration engine 700 includes p I/O controllers 744a-744p, each of which may include a separate root complex and may communicate with a separate set of I/O devices 732. In other examples, other standardized bus protocols, such as Ultra Path Interconnect (UPI) can be used for the host bus. In other examples, a proprietary bus protocol can be used.

Movement of data in the acceleration engine 700 can be managed by one or more processors 748a-748s, which can also be referred to as data management processors. In the example of FIG. 7, the acceleration engine 700 includes s processors 748a-748s incorporated into the device (e.g., on the same silicon die). In other examples, the processors 748a-748s can be external to the acceleration engine 700 (e.g., on a different die and/or in a different package). In some examples, the processors 748a-748s can manage the movement of data from I/O devices 732 to the accelerators 702a-702n or the DRAM 730. For example, input data may be located at an I/O device 732 or in processor memory, and the processors 748a-748s can move the input from the I/O device 732 or processor memory into an accelerator or into DRAM 730. As another example, program code for the accelerators 702a-702n may be located on an I/O device 732 or in processor memory.

The example acceleration engine 700 further includes DMA engines 746a-746d that can move data between the accelerators 702a-702n, DRAM controllers 742a-742k, and I/O controllers 744a-744p. In the illustrated example, the acceleration engine 700 includes d DMA engines 746a-746d. In some implementations, the DMA engines 746a-746d can be assigned to specific tasks, such as moving data from the DRAM controllers 742a-742d to the accelerators 702a-702n, or moving data between the I/O controllers 744a-744p and the accelerators 702a-702n. These tasks can be assigned, for example, by enqueueing descriptors with the DMA engines 746a-746d, where a descriptor identifies an address for a block of data and an operation (e.g., a read or a write) to perform. A descriptor, for example, can direct a DMA engine to instruct a DMA controller to read a block of data from DRAM 730. A descriptor can, as a further example, instruct the DMA engine to write data, read by the DMA controller, to an accelerator. Further descriptors can be used to move data from an accelerator to DRAM 730.

In various examples, each of the processors 748a-748s can be responsible for managing the data movement for a different accelerator. In some examples, a processor may manage the data movement for more than one accelerator. Similarly, in various examples, each of the processors 748a-748s can be assigned to one or more DMA engines 746a-746d. In these and other examples, associations between processors 748a-748s, accelerators 702a-702n, and DMA engines 746a-746d are determined by program code being executed by each respective processor.

In the example acceleration engine 700, the various components can communicate over a chip interconnect 720. The chip interconnect 720 primarily includes wiring for routing data between the components of the acceleration engine 700. In some cases, the chip interconnect 720 can include a minimal amount of logic, such as multiplexors to control the direction of data, flip-flops for handling clock domain crossings, and timing logic.

Figure 8:
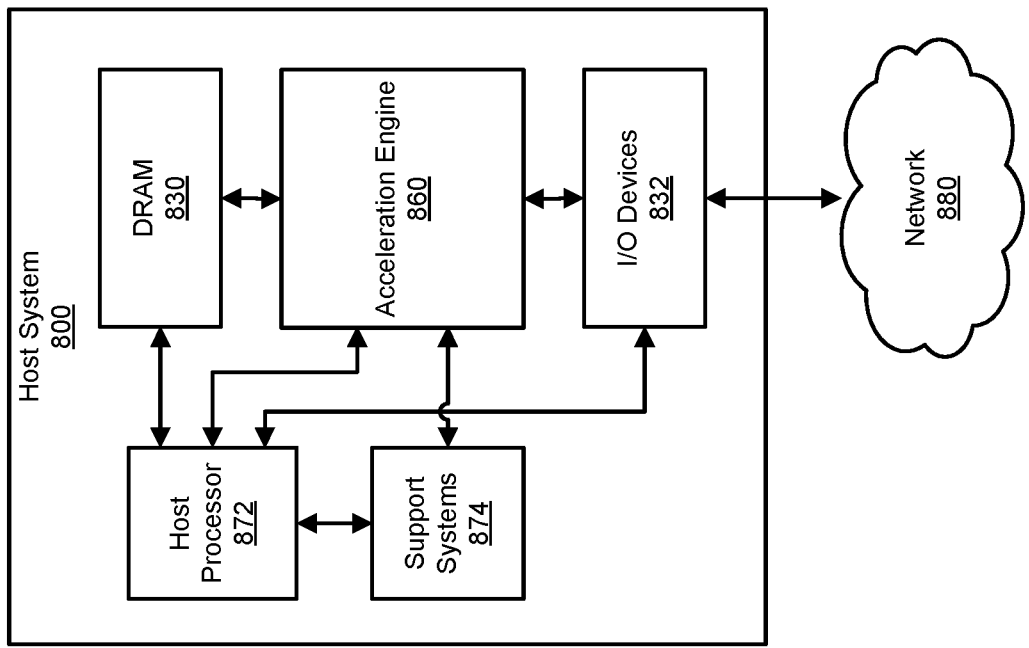
FIG. 8 illustrates a block diagram of an example of a host system.

FIG. 8 includes a block diagram that illustrates an example of a host system 800 in which an acceleration engine 860 can be used. The acceleration engine 860 of FIG. 8 is an example of a device that can include one or more accelerators such as is illustrated in FIG. 7. The example host system 800 of FIG. 8 includes the acceleration engine 860, a host processor 872, DRAM 830 or processor memory, I/O devices 832, and support systems 874. In various implementations, the host system 800 can include other hardware that is not illustrated here.

The host processor 872 is a general purpose integrated circuit that is capable of executing program instructions. In some examples, the host processor 872 can include multiple processing cores. A multi-core processor may include multiple processing units within the same processor. In some examples, the host system 800 can include more than one host processor 872. In some examples, the host processor 872 and the acceleration engine 860 can be one chip, such as, one or more integrated circuits within the same package.

In various examples, the host processor 872 can communicate with other components in the host system 800 over one or more communication channels. For example, the host system 800 can include a host processor bus, which the host processor 872 can use to communicate with the DRAM 830, for example. As another example, the host system 800 can include an I/O bus, such as a PCI-based bus, over which the host processor 872 can communicate with the acceleration engine 860 and/or the I/O devices 832, for example. In various examples, the host system 800 can, alternatively or additionally, include other communication channels or busses, such as serial busses, power management busses, storage device busses, and so on.

In some examples, software programs executing on the host processor 872 can receive or generate input for processing by the acceleration engine 860. In some examples, the programs can select an appropriate neural network to execute for a given input. For example, a program may be for language translation, and can select one or more neural networks capable of speech recognition and/or machine translation. In these and other examples, the programs can configure the acceleration engine 860 with the neural network to execute, and/or can select a neural network processing engine on the acceleration engine 860 that has previously been configured to execute the desired neural network. In some examples, once the acceleration engine 860 has started an inference on input data, the host processor 872 can manage the movement of data (such as weights, instructions, intermediate results, results of conditional layers, and/or final results) into or out of the acceleration engine 860.

In some examples, a software program that is using the acceleration engine 860 to conduct an inference can read the result from a conditional layer from the acceleration engine 860 and/or from a storage location, such as in DRAM 830. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 830 is memory that is used by the host processor 872 for storage of program code that the host processor 872 is in the process of executing, as well as values that are being operated on. In some examples, the data for a neural network (e.g., weight values, instructions, and other data) can be all or partially stored in the DRAM 830. DRAM is a common term for processor memory, and though DRAM is volatile memory, processor memory can be volatile and/or non-volatile. Though not illustrated here, the host system 800 can include other volatile and non-volatile memories for other purposes. For example, the host system 800 can include a Read-Only Memory (ROM) that stores boot code for booting the host system 800 at power on, and/or Basic Input/Output System (BIOS) code.

Though not illustrated here, the DRAM 830 can store instructions for various programs, which can be loaded into and be executed by the host processor 872. For example, the DRAM 830 can be storing instructions for an operating system, one or more data stores, one or more application programs, one or more drivers, and/or services for implementing the features disclosed herein.

The operating system can manage and orchestrate the overall operation of the host system 800, such as scheduling tasks, executing applications, and/or controller peripheral devices, among other operations. In some examples, a host system 800 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 800. For example, some drivers can provide communication between the operating system and peripheral devices or I/O devices 832. Alternatively or additionally, some drivers may provide communication between application programs and the operating system, and/or application programs and peripheral devices accessible to the host system 800. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 832 can include hardware for connecting to user input and output devices, such as keyboards, mice, pens, tablets, voice input devices, touch input devices, displays or monitors, speakers, and printers, among other devices. The I/O devices 832 can also include storage drives and/or network interfaces for connecting to a network 880. For example, the host system 800 can use a network interface to communicate with storage devices, user terminals, other computing devices or servers, and/or other networks, among various examples.

In various examples, one or more of the I/O devices 832 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 800 or may be in an external enclosure. A storage device can be fixed (e.g., attached by screws) or removable (e.g., having a physical release mechanism and possibly a hot-plug mechanism).

Storage devices, the DRAM 830, and any other memory component in the host system 800 are examples of computer-readable storage media. Computer-readable storage media are physical mediums that are capable of storing data in a format that can be read by a device such as the host processor 872. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 832 can be PCI-based devices. In these examples, a PCI-based I/O device includes a PCI interface for communicating with the host system 800. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-My allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 874 can include hardware for coordinating the operations of the acceleration engine 860. For example, the support systems 874 can include a microprocessor that coordinates the activities of the acceleration engine 860, including moving data around on the acceleration engine 860. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 872. In some examples, the program executed by the microprocessor is stored on the hardware of microprocessor, or on a non-volatile memory chip in the host system 800. In some examples, the microprocessor and the acceleration engine 860 can be on chip, such as one integrated circuit on the same die and in the same package.

In some examples, the support systems 874 can be responsible for taking instructions from the host processor 872 when programs executing on the host processor 872 request the execution of a neural network. For example, the host processor 872 can provide the support systems 874 with a set of input data and a task that is to be performed on the set of input data. In this example, the support systems 874 can identify a neural network that can perform the task, and can program the acceleration engine 860 to execute the neural network on the set of input data. In some examples, the support systems 874 only needs to select an appropriate neural network processing engine of the neural network processor. In some examples, the support systems 874 may need to load the data for the neural network onto the acceleration engine 860 before the acceleration engine 860 can start executing the neural network. In these and other examples, the support systems 874 can further receive the output of executing the neural network, and provide the output back to the host processor 872.

In some examples, the operations of the support systems 874 can be handled by the host processor 872. In these examples, the support systems 874 may not be needed and can be omitted from the host system 800.

In various examples, the host system 800 can include a combination of host systems, processor nodes, storage subsystems, and I/O chassis that represent user devices, service provider computers or third party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 800 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

Figure 9:
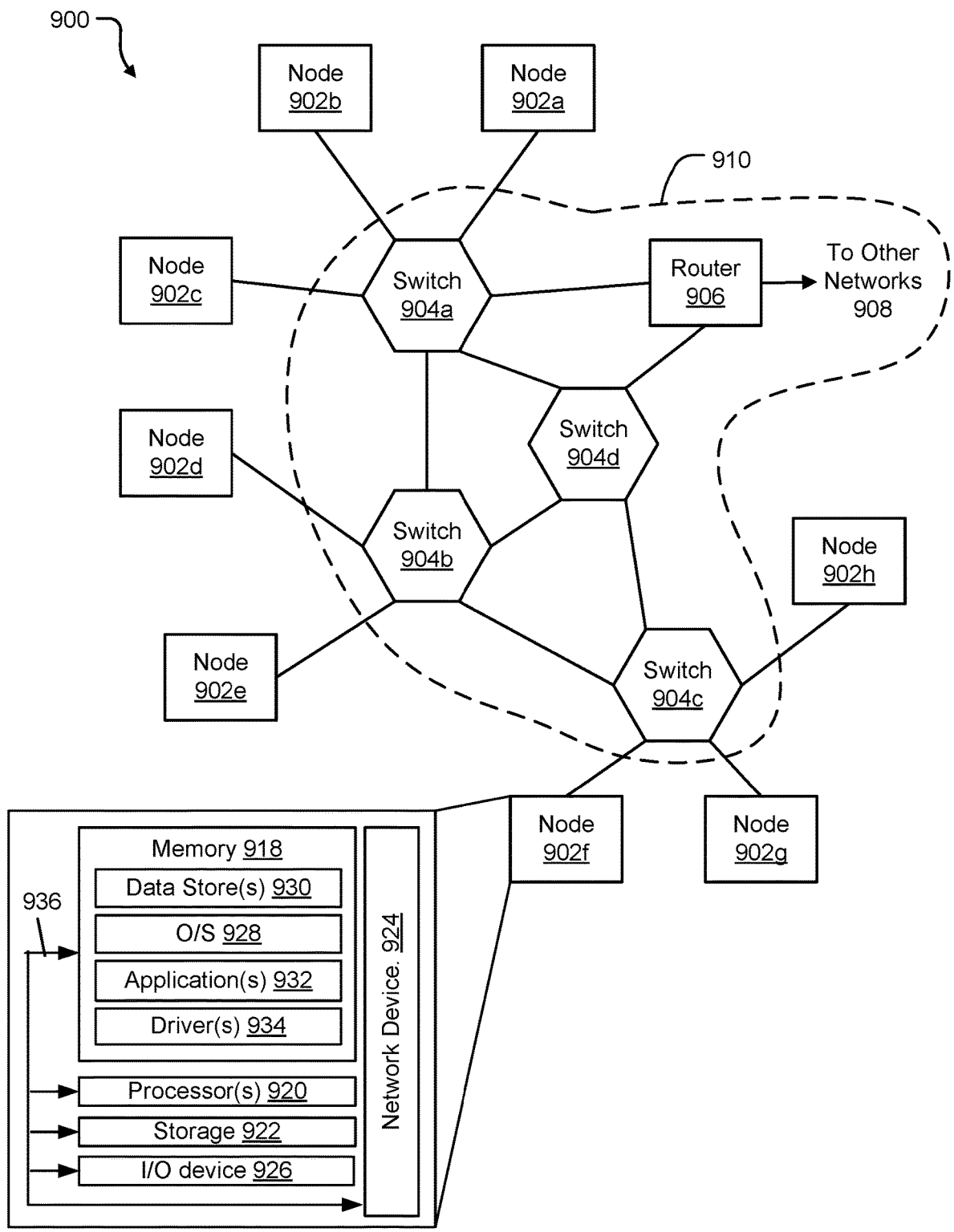
FIG. 9 includes a diagram of an example of a network.

FIG. 9 includes a diagram of an example network 900, which can include one or more host systems, such as the host system illustrated in FIG. 8. For example, the example network 900 of FIG. 9 includes multiple nodes 902a-902h, one or more of which can be a host system such as is illustrated in FIG. 8. Others of the nodes 902a-902h can be other computing devices, each of which include at least a memory for storing program instructions, a processor for executing the instructions, and a network interface for connecting to the network 900.

In various examples, the network 900 can be used to process data. For example, input data can be received at one of the nodes 902a-902h or from other networks 908 with which the network 900 can communicate. In this example, the input data can be directed to a node in the network 900 that includes an acceleration engine, for the acceleration engine to operate on and produce a result. The result can then be transferred to the node or other network from which the input data was received. In various examples, input data can be accumulated from various sources, including one or more of the nodes 902a-902h and/or computing devices located in the other networks 908, and the accumulated input data can be directed to one or more host systems in the network 900. Results from the host systems can then be distributed back to the sources from which the input data was gathered.

In various examples, one or more of the nodes 902a-902h can be responsible for operations such as accumulating input data for host systems to operate on, keeping track of which host systems are busy and which can accept more work, determining whether the host systems are operating correctly and/or most efficiently, monitoring network security, and/or other management operations.

In the example of FIG. 9, the nodes 902a-902h are connected to one another using a switched architecture with point-to point links. The switched architecture includes multiple switches 904a-904d, which can be arranged in a multi-layered network such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. The switches 904a-904d of FIG. 9 may be connected to the nodes 902a-902h and provide multiple paths between any two nodes.

The network 900 may also include one or more network devices for connection with other networks 908, such as a router 906. Routers use headers and forwarding tables to determine the best path for forwarding the packets, and use protocols such as internet control message protocol (ICMP) to communicate with each other and configure the best route between any two devices. The router 906 of FIG. 9 can be used to connect to other networks 908 such as subnets, LANs, wide area networks (WANs), and/or the Internet.

In some examples, network 900 may include any one or a combination of many different types of networks, such as cable networks, the Internet, wireless networks, cellular networks and other private and/or public networks. The interconnected switches 904a-904d and the router 906, if present, may be referred to as a switch fabric 910, a fabric, a network fabric, or simply a network. In the context of a computer network, terms "fabric" and "network" may be used interchangeably herein.

The nodes 902a-902h may be any combination of host systems, processor nodes, storage subsystems, and I/O chassis that represent user devices, service provider computers or third party computers.

User devices may include computing devices to access an application 932 (e.g., a web browser or mobile device application). In some aspects, the application 932 may be hosted, managed, and/or provided by a computing resources service or service provider. The application 932 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 908. Additionally, the user device(s) may be part of the distributed system managed by, controlled by, or otherwise part of the service provider computer(s) (e.g., a console device integrated with the service provider computers).

The node(s) of FIG. 9 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some examples, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 932 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 902a-902h may include at least one memory 918 and one or more processing units (or processor(s) 920). The processor(s) 920 may be implemented in hardware, computer-executable instructions, firmware, or combinations thereof. Computer-executable instruction or firmware implementations of the processor(s) 920 may include computer-executable or machine-executable instructions written in any suitable programming language to perform the various functions described.

In some instances, the hardware processor(s) 920 may be a single core processor or a multi-core processor. A multi-core processor may include multiple processing units within the same processor. In some examples, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 918 may store program instructions that are loadable and executable on the processor(s) 920, as well as data generated during the execution of these programs. Depending on the configuration and type of the node(s) 902a-902h, the memory 918 may be volatile (such as RAM) and/or non-volatile (such as ROM, flash memory, etc.). The memory 918 may include an operating system 928, one or more data stores 930, one or more application programs 932, one or more drivers 934, and/or services for implementing the features disclosed herein.

The operating system 928 may support nodes 902a-902h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 928 may also be a proprietary operating system.

The data stores 930 may include permanent or transitory data used and/or operated on by the operating system 928, application programs 932, or drivers 934. Examples of such data include web pages, video data, audio data, images, user data, and so on. The information in the data stores 930 may, in some implementations, be provided over the network(s) 908 to user devices. In some cases, the data stores 930 may additionally or alternatively include stored application programs and/or drivers. Alternatively or additionally, the data stores 930 may store standard and/or proprietary software libraries, and/or standard and/or proprietary application user interface (API) libraries. Information stored in the data stores 930 may be machine-readable object code, source code, interpreted code, or intermediate code.

The drivers 934 include programs that may provide communication between components in a node. For example, some drivers 934 may provide communication between the operating system 928 and additional storage 922, network device 924, and/or I/O device 926. Alternatively or additionally, some drivers 934 may provide communication between application programs 932 and the operating system 928, and/or application programs 932 and peripheral devices accessible to the service provider computer. In many cases, the drivers 934 may include drivers that provide well-understood functionality (e.g., printer drivers, display drivers, hard disk drivers, Solid State Device drivers). In other cases, the drivers 934 may provide proprietary or specialized functionality.

The service provider computer(s) or servers may also include additional storage 922, which may include removable storage and/or non-removable storage. The additional storage 922 may include magnetic storage, optical disks, solid state disks, flash memory, and/or tape storage. The additional storage 922 may be housed in the same chassis as the node(s) 902a-902h or may be in an external enclosure. The memory 918 and/or additional storage 922 and their associated computer-readable media may provide non-volatile storage of computer-readable instructions, data structures, program modules, and other data for the computing devices. In some implementations, the memory 918 may include multiple different types of memory, such as SRAM, DRAM, or ROM.

The memory 918 and the additional storage 922, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 918 and the additional storage 922 are examples of computer storage media. Additional types of computer storage media that may be present in the node(s) 902a-902h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 902a-902h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 902a-902h may also include I/O device(s) 926, such as a keyboard, a mouse, a pen, a voice input device, a touch input device, a display, speakers, a printer, and the like. The node(s) 902a-902h may also include one or more communication channels 936. A communication channel 936 may provide a medium over which the various components of the node(s) 902a-902h can communicate. The communication channel or channels 936 may take the form of a bus, a ring, a switching fabric, or a network.

The node(s) 902a-902h may also contain network device(s) 924 that allow the node(s) 902a-902h to communicate with a stored database, another computing device or server, user terminals and/or other devices on the network(s) 900.

In some implementations, the network device 924 is a peripheral device, such as a PCI-based device. In these implementations, the network device 924 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module may implement NVMe, and the network device 924 may be connected to a computing system using a PCIe interface.

A PCI-based device may include one or more functions. A "function" describes operations that may be provided by the network device 924. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 924 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computing system comprising:
   an execution engine;
   a memory subsystem coupled to the execution engine, the memory subsystem including a memory and a plurality of counters, each counter operable to count a number of access requests received by the memory subsystem that contains a token associated with a corresponding execution task of the execution engine; and
   a plurality of direct memory access engines operable to issue access requests to the memory subsystem, the access requests including:
      a first set of access requests each containing a first token and a first access count indicating a number of access requests in the first set of access requests to be performed before a first execution task of the execution engine is started; and
      a second set of access requests each containing a second token and a second access count indicating a number of access requests in the second set of access requests to be performed before a second execution task of the execution engine is started,
   wherein the memory subsystem is operable to:
      transmit a first notification to the execution engine to perform the first execution task in response to a first counter of the plurality of counters reaching the first access count indicating that the first set of access requests has been received, the first notification allowing the execution engine to start the first execution task while a sender of the first set of access requests is waiting for a first acknowledgement from the memory subsystem that the first set of access requests is complete;
      subsequent to the first notification, transmit the first acknowledgement to the sender of the first set of access requests;
      transmit a second notification to the execution engine to perform the second execution task in response to a second counter of the plurality of counters reaching the second access count indicating that the second set of access requests has been received, the second notification allowing the execution engine to start the second execution task while a sender of the second set of access requests is waiting for a second acknowledgement from the memory subsystem that the second set of access requests is complete; and subsequent to the second notification, transmit the second acknowledgement to the sender of the second set of access requests.

2. The computing system of claim 1, wherein the first set of access requests are write requests to write data to the memory to be used by the first execution task.

3. The computing system of claim 1, wherein the second set of access requests are read requests to move data from the memory to free up space in the memory for the second execution task.

4. A method comprising:
receiving, at a memory, a first access request of a set of access requests associated with a data transfer from a sender to access a memory location in the memory, the first access request having a token and an access count indicating a number of access requests in the set of access requests;
initiating a counter to count a number of received access requests having the token;
receiving, at the memory, additional access requests belonging to the set of access requests, each of the additional access requests having the token;
in response to receiving a last access request of the set of access requests having the token, transmitting a notification to an integrated circuit component to notify the integrated circuit component that the set of access requests has been received and the memory location is ready for access by the integrated circuit component, wherein the notification allows the integrated circuit component to access the memory location while the sender is waiting for an acknowledgement that the set of access requests is complete; and
transmitting the acknowledgement to the sender of the last access request after transmitting the notification.

5. The method of claim 4, further comprising:
resetting the counter in response to receiving the last access request to reach the access count.

6. The method of claim 4, further comprising:
receiving an intervening access request between access requests of the set of access requests, the intervening access request having a different token; and
initiating another counter to count a number of access requests having the different token.

7. The method of claim 4, wherein each of the access requests in the set of access requests includes the access count.

8. The method of claim 4, wherein the set of access requests are received from a plurality of senders.

9. The method of claim 4, wherein the token is included in a memory descriptor used by a direct memory access engine to transfer data with the memory.

10. The method of claim 9, wherein the token is embedded in an address field of the memory descriptor.

11. The method of claim 4, wherein the set of access requests are write requests to write data to the memory to be utilized by the integrated circuit component.

12. The method of claim 11, wherein the data includes weight data of a neural network model, and wherein the integrated circuit component is part of a neural network accelerator.

13. The method of claim 12, wherein the weight data is being written to the memory as part of a distributed training operation, or part of a distributed inference operation.

14. The method of claim 4, wherein the set of access requests are read requests to read data from the memory.

15. The method of claim 14, wherein the data is being read to free up space in the memory, and the notification is transmitted to the integrated circuit component to indicate that space is available in the memory for the integrated circuit component to use.

16. An apparatus comprising:
a memory;
a memory interface operable to receive access requests from a sender to access a memory location in the memory; and
a counter operable to count a number of access requests received by the memory interface having a token of a same value,
wherein the memory interface is operable to:
transmit a notification to an integrated circuit component to notify the integrated circuit component that the number of access requests has been received and the memory location is ready for access by the integrated circuit component in response to the counter reaching an access count associated with the token, wherein the notification allows the integrated circuit component to access the memory location while the sender of the access requests is waiting for an acknowledgement that the access requests are complete; and
transmit the acknowledgement to the sender of the access requests after transmitting the notification.

17. The apparatus of claim 16, further comprising multiple direct memory access (DMA) engines that are operable to issue the access requests having the token to the memory interface.

18. The apparatus of claim 16, wherein the memory interface is operable to receive the access requests having the token with intervening access requests having a different token.

19. The apparatus of claim 16, wherein the access requests are write requests to write data to the memory to be utilized by the integrated circuit component, or read requests to move data from the memory to free up space in the memory for the integrated circuit component.

* * * * *